United States Patent [19]

Grasso et al.

[11] Patent Number: 5,245,467
[45] Date of Patent: Sep. 14, 1993

[54] AMPLIFIER WITH A SAMARIUM-ERBIUM DOPED ACTIVE FIBER

[75] Inventors: Giorgio Grasso, Monza; Aldo Righetti, Milan; Flavio Fontana, Cormano, all of Italy

[73] Assignee: Pirelli Cavi S.p.A., Milan, Italy

[21] Appl. No.: 891,680

[22] Filed: May 28, 1992

Related U.S. Application Data

[63] Continuation of Ser. No. 603,793, Oct. 26, 1990, abandoned.

[30] Foreign Application Priority Data

Oct. 30, 1989 [IT] Italy .................... 22197 A/89

[51] Int. Cl.$^5$ .................... H01S 3/02; G02B 6/00
[52] U.S. Cl. .................... 357/341; 372/6; 359/342
[58] Field of Search .................... 359/337, 339; 372/11

[56] References Cited

U.S. PATENT DOCUMENTS

| | | | |
|---|---|---|---|
| 3,590,004 | 6/1971 | Woodcock | 372/6 |
| 3,599,106 | 8/1971 | Snitzer | 359/341 |
| 3,599,114 | 8/1971 | Snitzer et al. | 372/6 |
| 3,624,549 | 11/1971 | Geusic et al. | 372/75 |
| 3,626,312 | 12/1971 | Snitzer | 359/341 |
| 3,634,614 | 1/1972 | Geusic et al. | 250/458.1 |
| 3,640,891 | 2/1972 | Lee et al. | 330/4.3 |
| 3,729,690 | 4/1973 | Snitzer | 372/6 |
| 3,731,226 | 5/1973 | Snitzer et al. | 330/4.3 |
| 3,781,707 | 12/1973 | Hopkins et al. | 330/4.3 |
| 3,978,427 | 8/1976 | Truscott | 372/6 |
| 4,780,877 | 10/1988 | Snitzer | 330/4.3 |
| 4,947,134 | 8/1990 | Olssen | 359/345 |
| 4,962,067 | 10/1990 | Myers | 501/45 |
| 4,962,995 | 10/1990 | Andrews et al. | 350/96.34 |
| 5,087,108 | 2/1992 | Grasso et al. | 385/27 |
| 5,131,069 | 7/1992 | Hall et al. | 385/142 |

FOREIGN PATENT DOCUMENTS

1151039 7/1986 Japan.

OTHER PUBLICATIONS

Ainslie et al, Jour. of Lightwave Tech., vol. 6, π2, Feb. 1988; pp. 287–293.
Kimura et al, J. Appl. Phys., vol. 64, #2, Jul. 15, 1988, pp. 516–520.
Atkins et al, Electronics Letters, vol. 25, #14, pp. 910–911.
Payne et al; "Sm$_2$ Sensitization of Nd$^{3+}$ . . . Lasers", Proc. 1st Internat. Laser Sci. Conf., Nov. 22, 1983, pp. 237–238.
Hanna et al; A 1.54 um Br Glass Laser . . . ; Opt. Comm., vol. 63, #6, Sep. 15, 1987, pp. 417–420.

*Primary Examiner*—Nelson Moskowitz
*Attorney, Agent, or Firm*—Brooks Haidt Haffner & Delahunty

[57] ABSTRACT

An optical fiber and an optical amplifier, in particular for optical fiber telecommunication lines operating with a transmission signal in a predetermined wavelength range. The amplifier comprises laser emitting active optical fiber doped with erbium and a further doping substance, distributed along the fiber. The further doping substance has an absorption for a light having a wavelength lower than 1,540 nm substantially higher than the absorption that the further doping substance shows for a light having a wavelength varying from 1,540 nm to the upper limit of the predetermined wavelength range of the transmission signal. Preferably, the further doping substance is samarium. Samarium contained in the fiber is capable of absorbing the spontaneous erbium emission, which would constitute a noise source, thereby allowing a communication signal to be amplified in a wavelength range corresponding substantially to the tolerance range of the commercially available laser light emitters used as the communication signal source.

8 Claims, 4 Drawing Sheets

FIG. 1.
_PRIOR ART_
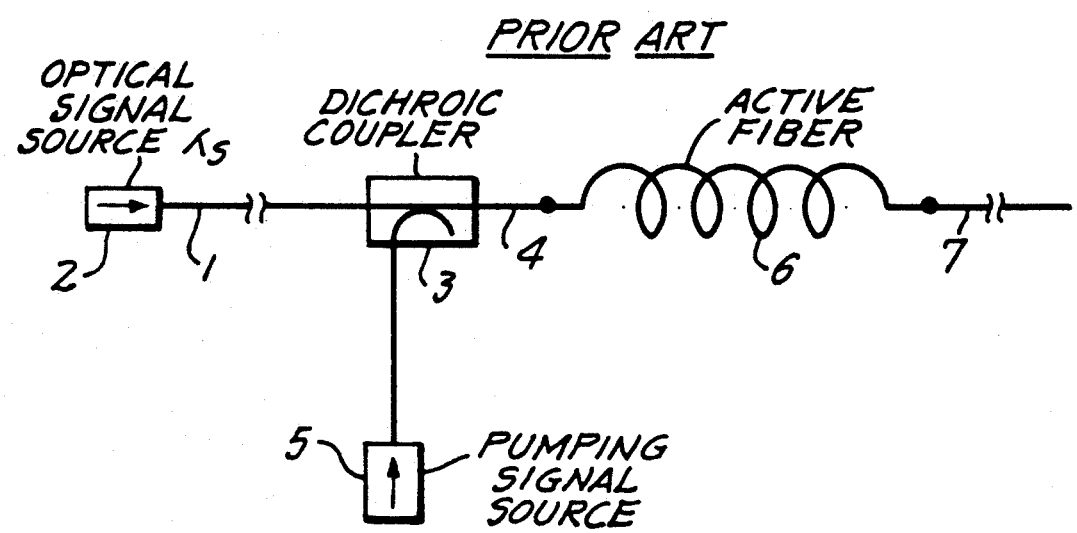

AMPLIFIER WITH A SAMARIUM-ERBIUM DOPED ACTIVE FIBER

This application is a continuation of application Ser. No. 07/603,793, filed Oct. 26, 1990 now abandoned.

FIELD OF THE INVENTION

The present invention relates to an optical fiber containing doping substances which are adapted to modify its characteristics of stimulated light emission and of absorption at a different wavelength and to an optical fiber amplifier including such fiber.

BACKGROUND OF THE INVENTION

It is known that optical fibers in which the core is doped with particular substances, for example, rare-earth ions, have stimulated emission characteristics adapted to be used as laser sources and in optical amplifiers.

In fact, these fibers can be supplied with a light energy at a particular wavelength, which is capable of bringing the doping substance atoms to an excited energy state, or pumping band, from which the atoms spontaneously decay in a very short time to a laser emission state in which state they remain for a relatively longer time.

When a fiber having a high number of atoms excited in the emission level is traversed by a light signal with a wavelength corresponding to such laser emission state, the light signal causes the transition of the excited atoms to a lower level and the light emission has the same wavelength as the signal. Therefore, a fiber of this kind can be used to obtain optical signal amplification.

Starting from the excited state, the atom decay can occur also spontaneously which gives rise to a random emission constituting a "background noise" overlapping the stimulated emission, corresponding to the amplified signal.

Such phenomena takes place at several wavelengths, typical of the doping substance, so as to give origin to a fluorescence spectrum. In order to obtain the maximum signal amplification by means of a fiber of the above type, together with a high signal-to-noise ratio, normally, the art uses a signal with a wavelength corresponding to a maximum of the fluorescence spectrum curve of the fiber incorporating the doping substance used. This signal usually is generated by a laser emitter or light source.

For example, such a fiber can be used as an amplifying fiber when the core of the fiber is doped with aluminum ($Al^{3+}$) and erbium ions ($Er^{3+}$), as described in U.S. application Ser. No. 07/363,072, filed Jun. 8, 1989. However, the erbium fluorescence spectrum, in the range Of the concerned wavelengths, has a particularly narrow emission peak which dictates the use, as a transmission signal source, of a laser emitter operating at a well defined wavelength with a limited tolerance because signals exceeding such tolerance would not be properly amplified and at the same time a strong amplification of the background noise would occur at this wavelength.

However, laser emitters or light sources having the required precision in wavelength are difficult and expensive to produce, whereas with the common industrial production of these devices, there is a rather large tolerance with respect to the emission wavelength.

While in some applications, such as, for example, submarine telecommunication lines, transmission signal emitters operating at the right wavelength could be used, for example, obtained through selection from commercially available lasers, so as to use only those having an emission strictly close to the laser emission peak of the amplifier fiber, this procedure is not acceptable from an economical point of view when other kinds of lines are concerned, such as, for example, municipal communication lines when it is of great importance to limit the installation costs.

For example, a fiber according to said application Ser. No. 07/363,072 having been doped with aluminum ions for modifying the index of refraction and with erbium ions to provide the laser emission has an emission peak of about 1,531 nm, and for a range of ±5 nm from this value provides a high intensity of emission and could be used for amplification. Therefore, for operating with this optical fiber, it is better to use a communication signal in the same wavelength range. However, commercially available semiconductor lasers, which could be suitable for the use, are usually made with emission wavelength values in the range of 1,520 to 1,570 nm.

As a result, a great number of commercially available lasers have wavelengths outside of the desired range and, therefore, cannot generate a signal adapted to be properly amplified.

On the other hand, it is known that erbium-doped fibers have an area in the emission spectrum with a high and substantially constant intensity in the wavelength range contiguous to the above described peak and comprising the signal range of the above mentioned commercially available lasers. However, in this optical fiber, a signal supplied at a wavelength removed from the maximum of the emission peak would be amplified in a reduced measure, whereas spontaneous transitions from the laser emission state in the fiber mainly take place with the emission at the wavelength of the spectrum peak, at 1,531 nm, thereby generating a "background noise" which will be further amplified through the fiber length and will overlap the useful signal.

It may be envisioned that filtering of the light emission constituting "the noise" at the end of the amplifier could be used, accepting therefore only the wavelength of the signal, which would require providing a suitable filter at the end of the active fiber. However, the presence of an undesired emission in the fiber in the range of the fiber maximum amplification would absorb pumping energy thereby making the fiber substantially inactive with respect to the communication signal amplification itself.

Interference filters are also known and can be disposed at different locations along the amplification fiber, but known filters of this kind are formed by discrete components, not made of fiber, and therefore, they need light beams in the air which make them unsuitable for industrial application.

The problem arises therefore of providing an active optical fiber to be employed in optical amplifiers which is adapted to be used together with commercially available lasers for the emission of the transmission signal without further restrictions.

BRIEF SUMMARY OF THE INVENTION

The present invention has, as one object, the provision of a doped optical fiber cable offering a satisfactory amplification in a sufficiently wide wavelength range so as to allow the use of commercially available lasers while, at the same time, preventing the spontaneous emissions of the material of the fiber at an undesired wavelength from impairing the amplification capability of the fiber and production of a background noise of great intensity with respect to the transmission signal.

In accordance with the present invention, an optical fiber comprising laser emitting substances, and particularly for use in optical fiber telecommunication lines is provided. The fiber contains erbium as the laser light emitting doping substance and is adapted to receive a telecommunication signal from a laser in a predetermined wavelength range, such fiber being characterized by the fact that it comprises as further doping substance, distributed along the fiber. Said further doping substance has an absorption, for light having a wavelength less than 1,540 nm, substantially higher than the absorption that the same doping substance shows for a light having a wavelength from 1,540 nm to the upper limit of the predetermined wavelength range of the transmission signal.

In the preferred embodiment of the present invention, the further doping substance is samarium, in the form of a trivalent cation.

The samarium concentration in the fiber with respect to the erbium concentration present in the fiber, expressed as a percentage by weight of the contained oxides is:

$$1 \leq \frac{(Sm_2O_3)}{(Er_2O_3)} \leq 10.$$

Another object of the present invention is an optical amplifier, in particular, for optical fiber telecommunication lines, operating with a transmission signal in a predetermined wavelength range, which comprises a laser light emitting active optical fiber doped with erbium, such fiber being characterized by the fact that the active optical fiber contains a further doping substance, distributed along the fiber and said doping substance has an absorption, for a light having a wavelength lower than 1,540 nm, substantially higher than the absorption that the further doping substance shows for a light with a wavelength varying from 1,540 nm to the upper limit of the predetermined wavelength range of the transmission signal. Preferably, the further doping substance is samarium.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a schematic diagram of an optical amplifier using an active fiber;

DETAILED DESCRIPTION OF EMBODIMENTS OF THE INVENTION

Figure 2:
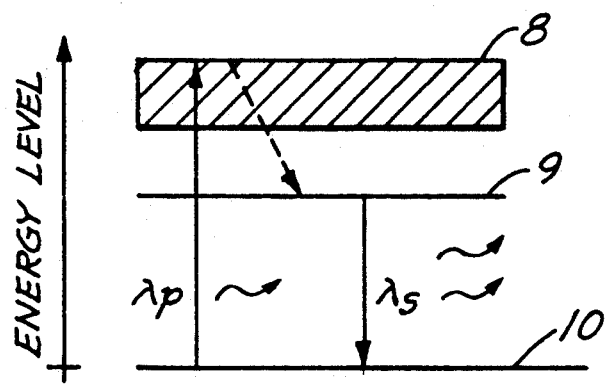
FIG. 2 is a diagram of the energy transitions of a fiber suitable for an amplifier of the type shown in FIG. 1, which transitions are adapted to generate a stimulated (laser) emission.

In order to amplify optical fiber telecommunication signals, optical fiber amplifiers can be used. The structure of typical amplifiers is diagrammatically shown in FIG. 1, where reference numeral 1 designates an optical telecommunication fiber over which a transmission signal of a wavelength $\lambda_s$ is sent and is generated by a signal emitting laser 2. Said signal, which attenuates after a certain line length, is sent to a dichroic coupler 3 where it joins, in the fiber 4, with a pumping signal having a wavelength $\lambda_p$ and generated by a pumping laser emitter 5. An active fiber 6, connected to the fiber 4 exiting from the coupler 3, constitutes the signal amplifying element which is then introduced into the optical fiber line 7 which extends to the signal destination or another coupler and amplifier.

For the active fiber 6, constituting the amplifying element in the amplifier unit, it is convenient to use a silica-based optical fiber doped in a solution containing $Al_2O_3$ and $Er_2O_3$, of the kind, for example, described in the above mentioned U.S. application Ser. No. 07/363,072 which allows an advantageous amplification of the transmission signal to be achieved by exploiting the laser transitions of erbium.

As shown in FIG. 2, which relates to a fiber of the stated type and illustrates the available energy state for an erbium ion in solution in the silica-based matrix of the fiber, the introduction into the active fiber 6 of a light energy at the "pumping" wavelength $\lambda_p$, lower than the transmission signal wavelength $\lambda_s$, brings a certain number of $Er^{3+}$ ions present in the fiber glass matrix as the doping substance to an "excited" energetic state 8, hereinafter referred to as "pumping" band, from which state the ion spontaneously decay to an energy level 9 constituting the laser emission level.

In the laser emission level 9, $Er^{3+}$ ions can remain for a relatively long time before undergoing a spontaneous transition to a base level 10.

It is known that while the transition from band 8 to level 9 is associated with a thermal-type emission, which is dispersed to the outside of the fiber (phonon radiation), the transition from level 9 to the base level 10, generates a light emission at a wavelength corresponding to the energy values of the laser emission level 9. If a fiber containing a high amount of ions at the laser emission level is transited by a signal having a wavelength corresponding to such emission level, said signal causes the stimulated transition of the $Er^{3+}$ ions from the emission state to the base state before the spontaneous decay thereof, through a cascade phenomenon, producing the emission of a greatly amplified transmission signal at the output of the active fiber 6.

Figure 3:
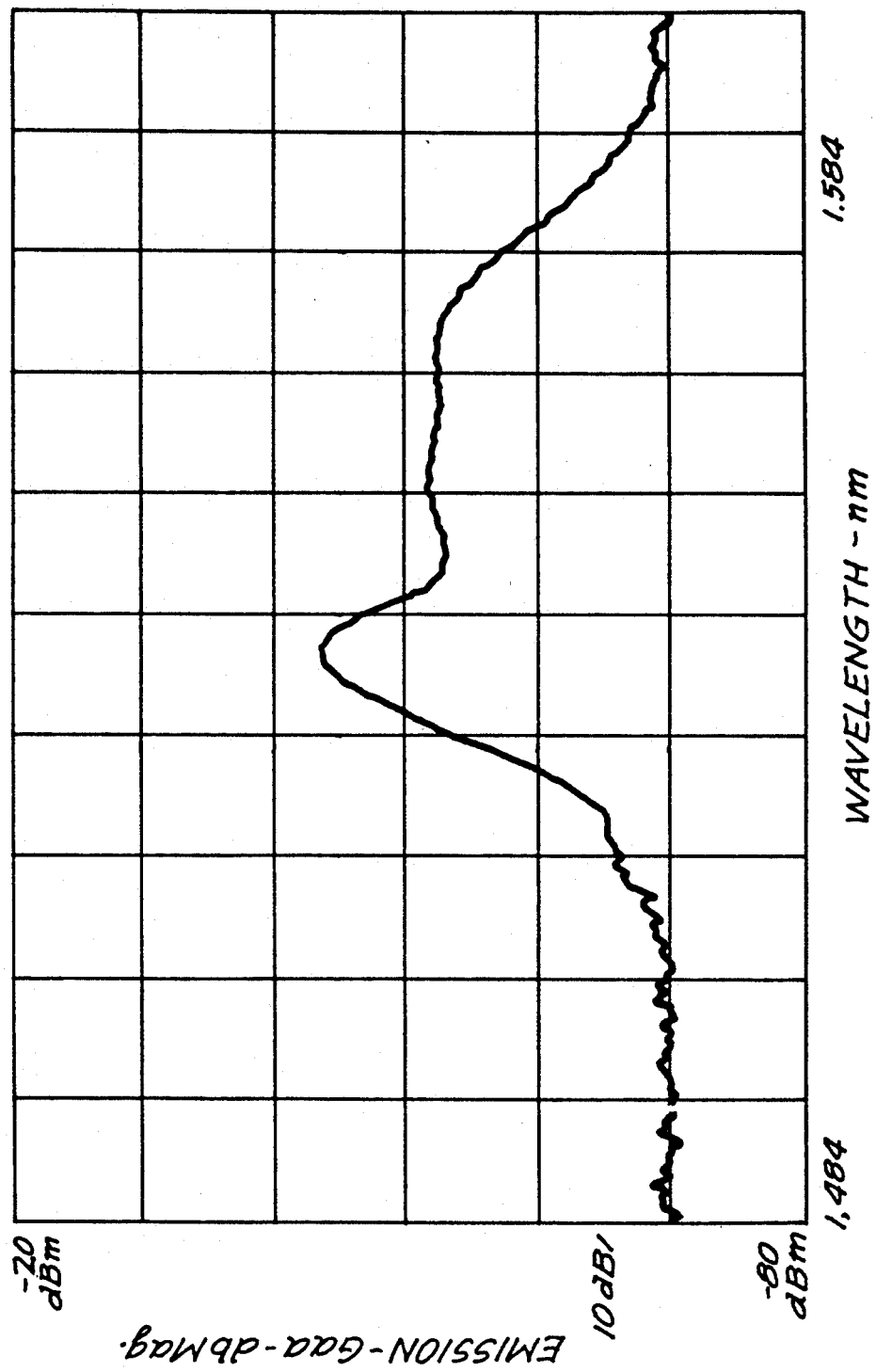
FIG. 3 is a graph of the stimulated emission of a silica-based optical fiber, doped with $Al^{3+}$ and with $Er^{3+}$.

In the absence of the transmission signal, the spontaneous decay from the laser emission state, which is of a discrete number typical of each substance, gives rise to a luminosity having peaks at different frequencies corresponding to the available levels. In particular, as shown in FIG. 3, a Si/Al fiber doped with $Er^{3+}$, and adapted for use in optical amplifiers, at a 1,531 nm wavelength exhibits an emission peak of great intensity, whereas at higher wavelengths, up to approximately 1,560 nm, there is an area in which the emission is still strong but the intensity is much lower.

In the presence of a light signal introduced into the fiber at the wavelength corresponding to the $Er^{3+}$ emission peak which is at 1,531 nm, a very strong signal amplification occurs, whereas the background noise given by the spontaneous emission of the erbium is limited which makes the fiber suitable for use in an optical amplifier for a signal of this wavelength.

The commercially available signal generation lasers of the semiconductor type (In, Ga, As) which are convenient to use for the source 2 have a typical emission band in the range of 1,520 to 1,570 nm. This means that the production technique used to manufacture them is unable to ensure the emission of the transmission signal at a precise frequency value corresponding to the emission peak of the erbium-doped fiber used for the amplifier. Accordingly, in a great percentage of produced lasers, the signal is localized in the areas of the fiber emission curve adjacent to said emission peak.

The signal generated by the latter laser signal generators cannot be amplified with a sufficient gain in an $Er^{3+}$-doped optical fiber amplifier of the above described type because the pumping power introduced into the active fiber 6 would be mostly used to amplify the background noise generated inside the active fiber 6 of the amplifier in correspondence to the spontaneous emission of erbium at 1,531 nm wavelength.

Figure 4:
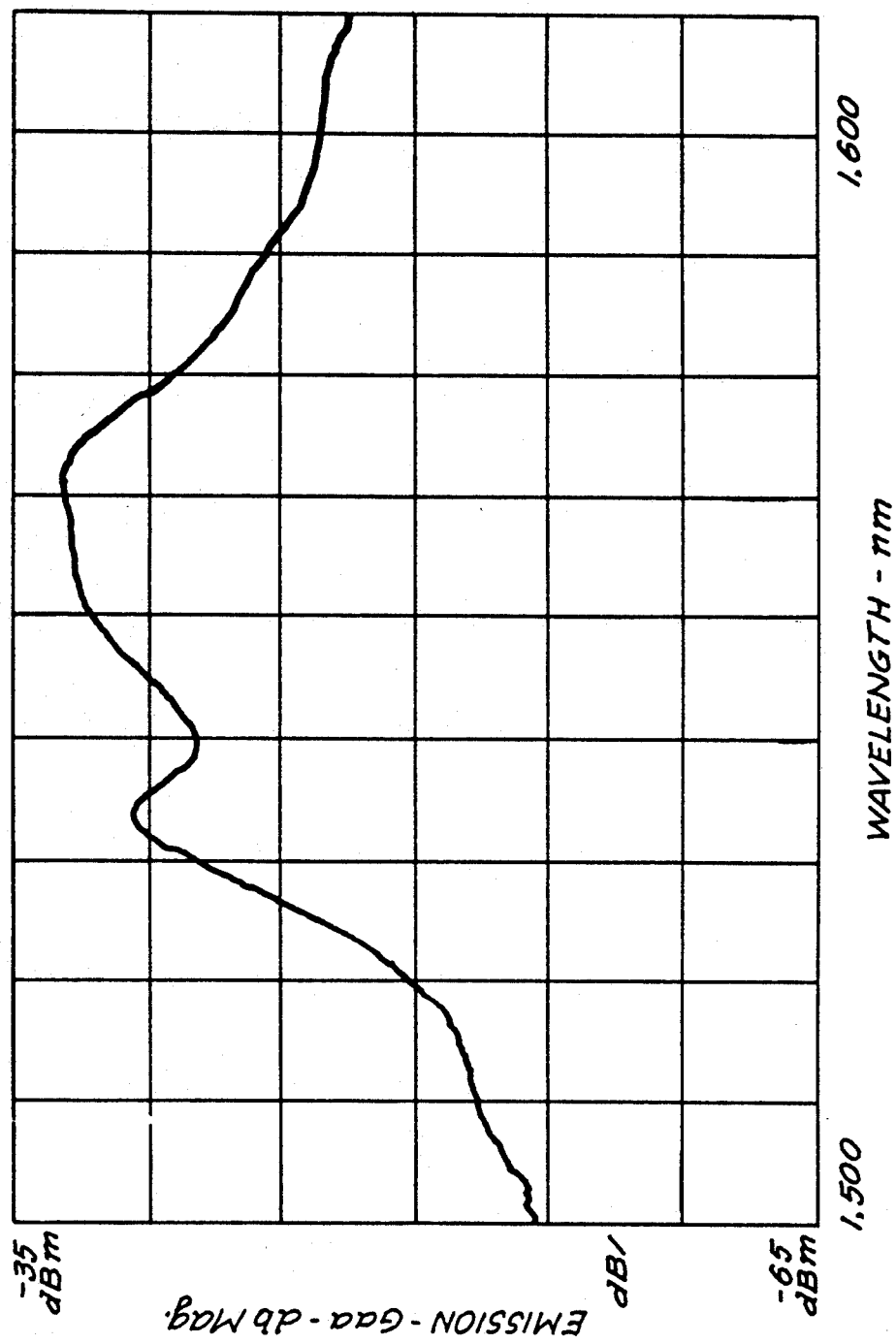
FIG. 4 is a graph of the stimulated emission of the optical fiber of FIG. 1 doped with $Al^{3+}$, with $Er^{3+}$ and with $Sm^{3+}$.

However, it has been observed that a fiber incorporating a quantity of samarium ($Sm^{3+}$) as a further doping substance, together with $Er^{3+}$, shows a stimulated emission curve, in the wavelength range, of the type shown in FIG. 4, without a peak localized at 1,531 nm of high intensity. Instead, a high emission of almost constant value over a wide range, substantially between 1,530 and 1,560 nm is obtained.

Such a fiber can be used in an optical amplifier, operating on a signal generated by commercially available laser signal emitters, because it is able to generate an amplifying effect with a satisfactory gain on a transmission signal in the last-mentioned wavelength range without adding an unacceptable quantity of "noise".

By way of example, an amplifier has been built according to the diagram shown in FIG. 1, the amplifier comprising an active fiber 6 of the "step index" Si/Al type doped with $Er^{3+}$ and with $Sm^{3+}$ and containing 40 ppm by weight of $Er_2O_3$. The length of the active fiber was 30 meters.

The pumping laser emitter 5 was an argon ion laser operating at 528 nm and operating with a power of 150 mW. The signal laser emitter 2 was a commercially available laser of the semiconductor type (In, Ga, As) which had a power of 1 mW and the emission wavelength of which was measured at 1,560 nm.

With said experimental configuration, downstream of the amplifier, a gain of 27 dB has been achieved with an input signal of 1 mW. In the absence of a signal, a spontaneous emission level of 10 μW was measured downstream of the amplifier. Such spontaneous emission, constituting the background noise produced by the amplifier, does not represent an important noise since the transmission signal is amplified to a much higher level (about 250 μW).

For comparison, the same transmission laser emitter 2 has been used together with an amplifier having the same structure as in the preceding example, but using an active fiber 6 of the "step index" Si/Al type doped only with $Er^{3+}$ and containing 40 ppm by weight of $Er^{3+}$. The active fiber was 30 meters long.

Said amplifier, with a transmission signal at 1,560 nm wavelength had a gain lower than 15 dB, and the spontaneous emission level was comparable to that of the output signal.

As can be seen from the above-described examples, the amplifier of the second example had a reduced gain while introducing such an amount of noise that the reception of the transmission signal was difficult so that said amplifier was practically useless. On the other hand, the amplifier using an active fiber in accordance with the invention, as is apparent from the first example, has a capability of supplying a high amplification gain together with a negligible amount of introduced noise.

The improved result obtained is considered to be caused by the presence of samarium as a further doping substance in the active fiber. In fact, samarium behaves as a wavelength emission absorber of erbium at 1,531 nm at the same time it does not substantially absorb light power at higher wavelengths, thereby "levelling", in this way, the spontaneous emission of the active fiber, so that it can effectively operate on transmission signals in a range sufficiently wide to accept the majority of commercially available semiconductor lasers (In, Ga, As).

Figure 5:
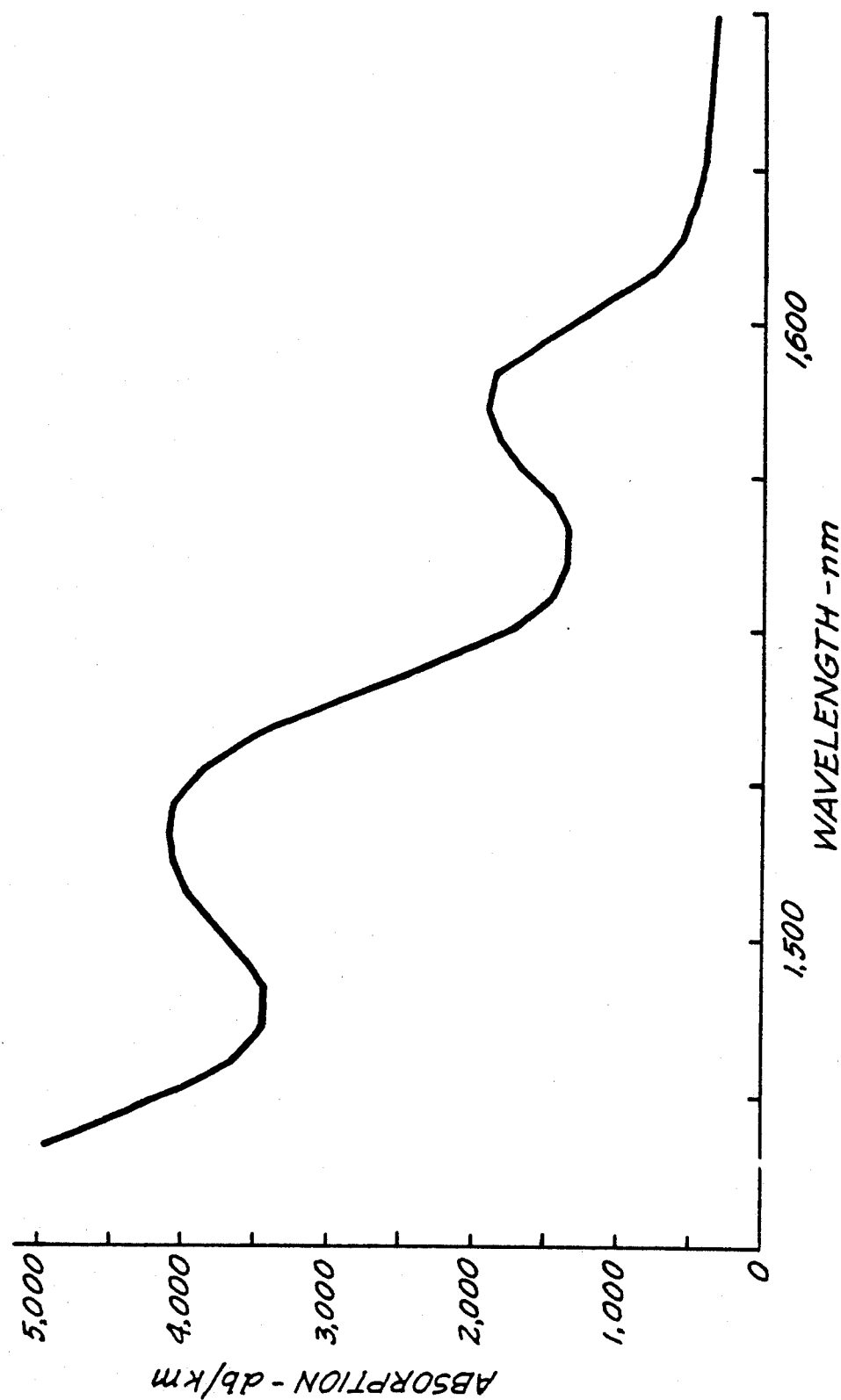
FIG. 5 is a graph of the light absorption of an optical silica fiber doped with $Al^{3+}$, with $Er^{3+}$ and with $Sm^{3+}$.

As illustrated in FIG. 5, which shows the absorption curve for unit of length of a Si/Al fiber doped with samarium, the presence of samarium in the fiber causes, for wavelengths substantially lower than 1,540 nm, an absorption much higher than the absorption shown between 1,540 and 1,560 nm. This means that samarium introduced in a fiber according to the present invention behaves as a "filter" distributed along the active fiber 6, absorbing photons emitted at 1,531 nm, as soon as photons are generated by spontaneous decay of the laser emission level of the $Er_{3+}$ ions. In this way, forward movement of such ions in the active fiber, causing further decays for this wavelength is avoided, and therefore, substracting pumping energy in the wavelength range adjacent the value at which the useful signal is sent and generating an amplified background noise.

The erbium quantity contained in the active fiber 6 is chosen according to the desired gain for the fiber length used, that is, the fiber length is selected according to the erbium quantity contained in the fiber as a function of the desired gain. Usually, the erbium contained in the fiber, in the form of oxide ($Er_2O_3$), varies from about 10 to about 100 ppm by weight.

In correspondence to these erbium concentration values in the fiber, the samarium concentration by weight in the form of oxide ($Sm_2O_3$) in the fiber, is equal to, or preferably more than, the erbium concentration, the range of the samarium concentration is given by the following:

$$1 \leq \frac{(Sm_2O_3)}{(Er_2O_3)} \leq 10$$

The doping substances can be introduced in the fiber, for example, through the "solution doping" technique, which is well known in the art and which ensures satisfactory qualitative results, or through other well known techniques according to specific needs. Despite the fact the invention has been particularly described in relation to the use of samarium as the doping substance in the active fiber, other doping substances can be used provided that they have a high light absorption corresponding to the erbium maximum spontaneous emission wavelength, particularly at about 1,531 nm and having, at the same time, a luminous absorption considerably less for wavelength values higher than this wavelength, preferably higher than 1,540 nm, for the whole wavelength range of tolerances for commercially available signal laser emitters.

In order not to influence the amplifier pumping power required to carry out the population inversion that causes the laser emission in the optical fiber, said pumping power being supplied to the fiber in the form of a light radiation with a wavelength less than the wavelength of the transmission signal, the doping substance to be added to erbium in the fiber cannot have, as is the case with samarium, a significant light absorption at the pumping wavelength which, preferably, is 528 or 980 nm.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An active optical fiber amplifier containing an active fiber with laser light emission doping substances for amplification of optical signals in a wavelength range from about 1,520 nm to about 1,570 nm, said optical fiber having a core containing erbium as laser light emission doping substance which, when pumped with light energy, raises ions thereof to an energy level state from which it decays with the emission of light at a wavelength in said wavelength range when subjected to said optical signals, said optical fiber also containing samarium as a further doping substance distributed along the core of the fiber, said further doping substance having an absorption for light at a wavelength lower than 1,540 nm which is substantially higher than the light absorption of said further doping substance for light having a wavelength in the range from 1,540 nm to the upper limit of said wavelength range of said optical signals, a source of said optical signals coupled to an end portion of said optical fiber and a pumping light source for providing light energy at a wavelength lower than 1520 nm but at a wavelength at which there is no substantial absorption of said pumping light energy by said further doping substance and coupled to an end portion of said optical fiber for raising the ions of said erbium to said energy level state without causing immediate light emission by said ion, in the absence of said optical signals.

2. An optical amplifier as set forth in claim 1 wherein said further doping substance is Samarium in the form of a trivalent cation and said pumping wavelength is 980 nm.

3. An active optical fiber comprising laser emission doping substances according to claim 2 wherein the samarium concentration in the fiber, with respect to the erbium concentration in the same fiber, expressed as a percentage by weight of the contained oxides, is in the range:

$$1 \leq \frac{(Sm_2O_3)}{(Er_2O_3)} \leq 10.$$

4. An active optical fiber according to claim 3 wherein the erbium oxide is present in the range of from about 10 to about 100 ppm by weight.

5. An optical amplifier for amplification of optical signals in a signal wavelength range from about 1,520 to 1,570 nm, said amplifier comprising:
a silica-based laser light emitting active optical fiber having a core doped with Erbium which, when pumped with light energy, raises ions thereof to an energy level from which they decay with stimulated light emission in an emission wavelength range comprising said signal wavelength range when subjected to said optical signals;
said active optical fiber containing samarium as a further dopant in the core, distributed along the active fiber, said further dopant having an absorption for light at least in a wavelength range comprised in said emission wavelength range, said light absorption at a wavelength lower than 1,540 nm being substantially higher than the light absorption of said further doping substance for light having a wavelength in the range from 1,540 nm to the upper limit of said signal wavelength range;
a pumping light source for providing pumping light energy at a wavelength lower than said wavelength range but at a wavelength at which there is no substantial absorption of said pumping light energy by said further dopant; and
coupling means for coupling said pumping light energy into said active optical fiber, thereby raising said Erbium ions to said energy level.

6. An optical amplifier as set forth in claim 5 wherein said further doping substance is Samarium in the form of a trivalent cation and said pumping wavelength is 980 nm.

7. An optical amplifier according to claim 6 wherein the samarium concentration in the active optical fiber with respect to the erbium concentration in the fiber, expressed as a percentage by weight of the oxides contained in the fiber is in the range $$1 \leq \frac{(Sm_2O_3)}{(Er_2O_3)} \leq 10.$$

8. An optical amplifier according to claim 7 wherein the erbium oxide is present in the range of from about 10 to about 100 ppm by weight.

* * * * *